United States Patent [19]
Kosaka et al.

[11] 3,761,542
[45] Sept. 25, 1973

[54] GRAFT POLYMER OF VINYL CHLORIDE AND METHOD OF PRODUCING SAME

[75] Inventors: Yujiro Kosaka; Masaru Uemura; Mitsutaka Saito; Yuji Suzuki; Kunio Takamoto, all of Yamaguchi, Japan

[73] Assignee: Toyo Soda Manufacturing Co., Ltd., Yamaguchi, Japan

[22] Filed: Sept. 29, 1971

[21] Appl. No.: 184,959

Related U.S. Application Data

[63] Continuation-in-part of Ser. No. 6,299, Jan. 27, 1970, abandoned.

[30] Foreign Application Priority Data
Jan. 27, 1969 Japan.................................. 44/5846

[52] U.S. Cl. ............................ 260/878 R, 260/884
[51] Int. Cl. ........................................... C08f 15/00
[58] Field of Search ........................ 260/878 R, 884

[56] References Cited
UNITED STATES PATENTS
3,268,623  8/1966  Beer................................ 260/878 R
FOREIGN PATENTS OR APPLICATIONS
743,641  9/1966  Canada........................... 260/878 R Primary Examiner—Joseph L. Schofer
Assistant Examiner—A. Holler
Attorney—Sughrue, Rothwell, Mion, Zinn and Macpeak

[57] ABSTRACT

A graft polymer prepared by polymerizing vinyl chloride onto chlorinated polyethylene, ethylene-vinyl acetate copolymer and/or chlorinated ethylene-vinyl acetate copolymer in the presence of methyl methacrylate homopolymer or copolymer. The polymer possesses favorable transparency and superior impact resistance. The process for producing such a graft polymer is also contemplated.

13 Claims, No Drawings

GRAFT POLYMER OF VINYL CHLORIDE AND METHOD OF PRODUCING SAME

CROSS REFERENCE TO RELATED APPLICATIONS

This application is a continuation-in-part application of copending application, Ser. No. 6,299, filed Jan. 27, 1970 now abandoned.

BACKGROUND OF THE INVENTION

1. Field of the Invention

This invention relates to vinyl chloride polymers which have both superior properties in transparency and impact resistance and a process for producing same.

2. Description of the Prior Art

Polyvinyl chloride (PVC) is used widely for sheets, films, coatings, moldings and extrusions because of its considerable hardness, excellent transparency and non-flammability. Unfortunately, however, it has certain disadvantages; namely, poor impact resistance, thermal stability and processability. Various attempts have been made to remove these deficiencies. One method involves the blending of various polymers, for example, the blending of PVC with a rubberlike material such as ethylene-vinyl acetate copolymer (EVA copolymer), chlorinated polyethylene or acrylonitrile-butadiene-styrene terpolymer.

Unfortunately, however, these high polymers, which can be employed together with PVC to improve its impact resistance, frequently have poor compatibility therewith and, therefore, even if the impact resistance is improved by such blending, the transparency of the blend so produced is not at all satisfactory. Of course, there are PVC modifiers such as methyl methacrylate-butadiene-styrene terpolymer, but this butadiene polymer contains a double bond and resistance to weathering of the final product is therefore poor.

SUMMARY OF THE INVENTION

It has now been found that the properties of PVC can be considerably improved if the PVC is actually formed by graft polymerization on a polymer substrate. By suitable selection of the polymer substrate, there can be formed a PVC graft polymer which has excellent transparency, impact resistance and weatherability.

DETAILED DESCRIPTION OF THE INVENTION

This invention provides a vinyl chloride graft polymer comprising vinyl chloride polymerized onto an ethylene polymer in the presence of a methyl methacrylate polymer or copolymer. The essence of this invention resides in the fact that the methyl methacrylate polymer and the substrate are dissolved in vinyl chloride monomer and then polymerized. The methyl methacrylate polymer or its copolymer used in this invention is that obtained by radically polymerizing methyl methacrylate monomer, or methyl methacrylate and a co-monomer such as styrene, acrylonitrile, acrylate, and the like. For optimum performance, the methyl methacrylate homopolymer or its copolymer will have an average molecular weight of 40,000 to 400,000, and the methyl methacrylate copolymer will have a minimum of 80 percent by weight methyl methacrylate.

The amount of methyl methacrylate polymer or its copolymer ranges from 3 to 10 percent, preferably 5 to 8 percent, by weight (based on the obtained graft copolymer).

The substrate polymer of this invention is an ethylene polymer. More particularly, it may be selected from chlorinated polyethylene, ethylene-vinyl acetate copolymer and/or chlorinated ethylene-vinyl acetate copolymer. In addition, ethylene-ethyl acrylate copolymer and its chlorinated derivatives can be used as a substrate of the present invention. The degree of chlorination of the chlorinated ethylene polymers employed herein should range from 5 to 50 percent by weight, preferably 20 to 40 percent by weight. The amount of the substrate polymer is generally in the range of from 3 to 20 percent by weight and is preferably in the range of 4 to 15 percent by weight (based on the obtained graft copolymer). Suitable co-monomer content of the ethylene copolymers is from 3 to 50 percent by weight. The melt index of the substrate should range from 0.1 to 30 g/10 min, preferably from 1 to 10 g/10 min.

The polymerization may be carried out in the range of 40°C to 70°C. For example, the polymerization is conveniently performed in the presence of suitable radical polymerization initiators such as a peroxide (such as isobutyryl peroxide, benzoyl peroxide, acetylcyclohexane sulfonyl peroxide, lauroyl peoxide, t-butyl peroxypivalate, decanoyl peroxide, t-butyl peroxy maleic acid or di-isopropyl-peroxydicarbonate) or an azo compound such as azobisisobutyronitrile. The free radical initiators may be used in a range of from 0.01 to 0.5 percent by weight based on the weight of vinyl chloride monomer to be polymerized. The polymerization may be effected according to standard grafting techniques which may be a bulk, suspension, emulsion or solution process.

The vinyl chloride graft copolymers of this invention have excellent transparency (similar to that of PVC itself) and have a remarkable impact resistance and processability. The product of this invention comprises a vinyl chloride polymer grafted onto an ethylene polymer substrate and methyl methacrylate polymer, in combination with a poly-vinyl chloride. The molecular weight of the product, depending on the polymerization conditions, will generally range from 20,000 to 100,000.

This invention will now be illustrated, but not restricted, by the following examples, in which all percent and parts are by weight unless otherwise stated.

EXAMPLE 1

The following ingredients were mixed in a 2 liter autoclave equipped with a mechanical stirrer:
- 213 g vinyl chloride
- 25 g chlorinated polyethylene (containing 33% chlorine and having a density of 0.921 and a M.I. of 3)
- 30 g polymethyl methacrylate; specific viscosity*/ (As measured in acetone at a level of 0.1 percent by weight at 25°C.) of 0.155

This mixture was dissolved with stirring at 60°C for one hour, then 800 g of deionized water, 147 g of vinyl chloride, 1.2 g of polyvinyl alcohol and 0.6 g of lauroyl peroxide were added thereto, and polymerization was carried out at 60°C for 7 hours.

At the end of this time, the particles of the graft copolymer were filtered, washed with water, and dried in vacuo to give 320 g of graft copolymer.

The above graft polymerization was effected in various comparative examples, varying only the amount of polymethyl methacrylate, i.e., using 20 g, 10 g and none instead of 30 g of polymethyl methacrylate), and there was obtained, respectively, 321 g, 302 g and 297 g of graft polymers.

One hundred parts of graft copolymer from each of these preparations were mixed at 180°C on a rolling mill with 3 parts of the stabilizer Advastab T17MJ, a polymeric tin mercaptide stabilizer, and one part of stearic acid, and test specimens were prepared therefrom. The properties of the respective products are compared below:

| Charge content of polymethyl methacrylate (g) | 0 | 10 | 20 | 30 |
|---|---|---|---|---|
| Tensile strength (kg/cm²) (JIS6745) | 470 | 470 | 480 | 480 |
| Tensile impact strength (kg.cm/cm²) (ASTM D1822) | 190 | 180 | 190 | 190 |
| Elongation (%) (JIS 6745) | 190 | 180 | 180 | 175 |
| Softening temperature (°C) (JIS 6745) | 61 | 62 | 62 | 64 |
| Haze value (%) */ | 8.2 | 5.9 | 5.3 | 5.5 |

* Haze value was determined with a polymer sheet 1 mm thick in compliance with ASTM D1003-61. The smaller the value, the better was the transparency of the product.

The physical properties of PVC homopolymer polymerized at 60°C are cited below in a comparable example:

| | |
|---|---|
| Tensile strength (kg/cm²) | 520 |
| Tensile impact strength (kg.cm/cm²) | 50 |
| Elongation (%) | 160 |
| Softening Temperature (°C) | 64 |
| Haze value (%) | 4.1 |

It will be noted from the above data that the graft polymer containing both methyl methacrylate polymer and chlorinated polyethylene as substrates is superior in transparency to the graft polymer containing no methyl methacrylate polymer and its impact strength is greatly improved over PVC.

EXAMPLE 2

The following ingredients were mixed in a 2 liter autoclave equipped with a mechanical stirrer:
  210 g vinyl chloride
  25 g chlorinated polyethylene (the same as that used in Example 1)
  15 g methyl methacrylate-styrene copolymer (containing 90 mol% methyl methacrylate) (specific viscosity of 0.530)

This mixture was dissolved with stirring at 60°C for one hour. Then 800 ml of water, 156 g of vinyl chloride, 1.2 g of polyvinyl alcohol and 0.6 g of lauroyl peroxide were added thereto, and polymerization was carried out at 60°C for 7 hours. The yield of the graft polymer was 316 g (Sample (A).

Instead of methyl methacrylate copolymer, 15 g of methyl methacrylate-acrylonitrile copolymer (containing 90 mol% of methyl methacrylate) was charged in the autoclave and polymerized under the same conditions as above to give 307 g of graft polymer (Sample B).

The properties of the graft polymers obtained are listed below:

| Property | Sample A | Sample B |
|---|---|---|
| Tensile strength (kg/cm²) | 460 | 470 |
| Tensile impact strength (kg·cm/cm²) | 200 | 190 |
| Elongation (%) | 180 | 170 |
| Softening temperature (°C) | 64 | 64 |
| Haze value (%) | 5.8 | 5.5 |

EXAMPLE 3

The following ingredients were mixed in a 2 liter autoclave equipped with a mechanical stirrer:
  356 g vinyl chloride
  25 g chlorinated polyethylene containing 31% chlorine and having a density of 0.912 and a M.I. of 70
  20 g polymethyl methacrylate (specific viscosity of 0.125)

This mixture was dissolved with stirring at 60°C for one hour. Then 800 ml of water containing 1.2 percent of polyvinyl alcohol and 0.6 g of lauroyl peroxide were added thereto, and polymerization was effected at 60°C for 7 hours. The yield of graft copolymer was 322 g (Sample C).

For the sake of comparison, the same mixture, but without the addition of polymethyl methacrylate, was polymerized under the same conditions as specified above and 305 g of graft copolymer was obtained (Sample D).

The properties of the graft copolymers obtained are listed below:

| Property | Sample C | Sample D |
|---|---|---|
| Tensile strength (kg/cm²) | 460 | 430 |
| Tensile impact strength (kg·cm/cm²) | 200 | 190 |
| Elongation (%) | 190 | 210 |
| Softening temperature (°C) | 65 | 64 |
| Haze value (%) | 12.9 | 40.5 |

EXAMPLE 4

Into a stainless steel ampoule of 200 ml capacity was placed 140 g of vinyl chloride, 14 g of EVA copolymer (containing 31% vinyl acetate and having a M.I. of 24), 10 g of polymethyl methacrylate (specific viscosity of 0.224) and 0.3 g of lauroyl peroxide. Then three stainless steel balls having a diameter of 2 cm were put into the ampoule for agitation, and the ampoule was tumbled by a mechanical device in an air oven at 60°C for 6 hours. The yield of graft polymer was 138 g (Sample E).

The same mixture, but without addition of polymethyl methacrylate, was subjected to polymerization under the same conditions as specified above in a comparison example. 125 g of graft polymer was obtained (Sample F).

The properties of the graft polymers so obtained are listed below:

| Property | Sample E | Sample F |
|---|---|---|
| Tensile strength (kg/cm²) | 380 | 340 |
| Tensile impact strength (kg·cm/cm²) | 230 | 250 |
| Elongation (%) | 150 | 160 |
| Softening temperature (°C) | 55 | 52 |
| Haze value | 17.4 | 26.3 |

EXAMPLE 5

A graft polymer was prepared by the method described in Example 1 using the following ingredients:
  360 g vinyl chloride
  30 g chlorinated EVA copolymer (containing 32% chlorine and 6% vinyl acetate and having a M.I. of 0.6)
  20 g polymethyl methacrylate (specific viscosity of 0.155)
  800 ml water 1.2 g polyvinyl alcohol
0.6 g lauroyl peroxide Dissolving was carried out at 60°C for one hour and polymerization was run at 60°C for 7 hours. The yield of graft polymer was 318 g (Sample G).

The same materials, but without addition of polymethyl methacrylate, were subjected to polymerization under the same conditions as specified above in a comparison example. 301 g of graft polymer was obtained (Sample H).

The properties of the graft polymers so obtained are listed below:

| Property | Sample G | Sample H |
|---|---|---|
| Tensile strength (kg/cm$^2$) | 465 | 450 |
| Tensile impact strength (kg·cm/cm$^2$) | 200 | 220 |
| Elongation (%) | 190 | 180 |
| Softening temperature (°C) | 64 | 62 |
| Haze value (%) | 4.7 | 5.4 |

EXAMPLE 6

A graft polymer was prepared by the method described in Example 1 using the following ingredients:
367 g vinyl chloride
15 g chlorinated polyethylene (as in Example 1)
15 g chlorinated EVA copolymer (as in Example 5)
20 g polymethyl methacrylate (specific viscosity of 0.155)
800 ml water
1.2 g polyvinyl alcohol
0.6 g lauroyl peroxide Dissolving was carried out at 60°C for one hour and polymerization was run at 60°C for 7 hours. The yield of graft polymer was 331 g (Sample I).

The same material, but without polymethyl methacrylate, was subjected to polymerization under the same conditions in a comparison example. 315 g of graft polymer was obtained (Sample J).

The properties of the graft polymer so obtained are listed below:

| Property | Sample I | Sample J |
|---|---|---|
| Tensile strength (kg/cm$^2$) | 485 | 460 |
| Tensile impact strength (kg·cm/cm$^2$) | 210 | 210 |
| Elongation (%) | 180 | 190 |
| Softening temperature (°C) | 63 | 61 |
| Haze value (%) | 4.9 | 6.0 |

EXAMPLE 7

The following ingredients were mixed in a 2 liter autoclave equipped with a mechanical stirrer:
376 g vinyl chloride
65 g chlorinated polyethylene (containing 46% chlorine and having a density of 0.921 and a M.I. of 3)
20 g polymethyl methacrylate (specific viscosity of 0.155)
800 ml water
1.2 g polyvinyl alcohol
0.6 g lauroyl peroxide Dissolving was carried out at 60°C for one hour and polymerization was effected at 60°C for 7 hours. The yield of the graft polymer was 372 g (Sample K).

The same materials but without addition of polymethyl methacrylate, was subjected to polymerization under the same conditions as specified above in a comparison example. 358 g of graft polymer was obtained (Sample L).

The properties of the graft polymers so obtained are listed below:

| Property | Sample K | Sample L |
|---|---|---|
| Tensile strength (kg/cm$^2$) | 410 | 400 |
| Tensile impact strength (kg·cm/cm$^2$) | 230 | 240 |
| Elongation (%) | 220 | 250 |
| Softening temperature (°C) | 54 | 53 |
| Haze value (%) | 6.8 | 15.3 |

EXAMPLE 8

The following ingredients were mixed in a 2 liter autoclave equipped with a mechanical stirrer:
358 g vinyl chloride
15 g chlorinated ethylene-vinyl acetate copolymer (containing 22% chlorine and 6% vinyl acetate and having a M.I. of 0.6)
10 g polymethyl methacrylate (specific viscosity of 0.155)
800 ml water
1.2 g polyvinyl alcohol
0.6 g lauroyl peroxide Dissolving was carried out at 60°C for one hour and polymerization was effected at 60°C for 7 hours. The yield of graft polymer was 323 g (Sample M).

The same materials, but without addition of polymethyl methacrylate, were polymerized under the same conditions as specified above in a comparison example. 318 g of graft polymer was obtained (Sample N).

The properties of the graft polymers so obtained are listed below:

| Property | Sample M | Sample N |
|---|---|---|
| Tensile strength (kg/cm$^2$) | 490 | 480 |
| Tensile impact strength (kg·cm/cm$^2$) | 140 | 140 |
| Elongation (%) | 170 | 180 |
| Softening temperature (°C) | 63 | 63 |
| Haze value (%) | 6.2 | 7.3 |

What is claimed is:

1. In a process for the production of a vinyl chloride graft polymer which comprises polymerizing vinyl chloride onto a polymer substrate selected from the group consisting of polyethylene, ethylene-vinyl acetate copolymer, ethylene-ethyl acrylate copolymer, and chlorinated derivatives thereof, the improvement which comprises in a suspension, emulsion, solution or bulk polymerization the graft co-polymerizing of said vinyl chloride onto said polymer substrate, and onto a polymer of methyl methacrylate compatible with said vinyl chloride.

2. The process of claim 1, wherein said polymer of methyl methacrylate has an average molecular weight of from 40,000 to 400,000 and wherein said polymer of methyl methacrylate comprises 80 percent by weight methyl methacrylate.

3. The process of claim 1, wherein said polymerization is conducted at a temperature of 40°C to 70°C.

4. The process of claim 1, wherein said polymer substrate is a chlorinated derivative having a chlorine content of from 5 to 50 percent by weight of the chlorinated polymer.

5. The process of claim 1, wherein said polymerization takes place in the presence of a radical polymerization initiator.

6. The process of claim 5, wherein the polymerization initiator is selected from the group consisting of benzoyl peroxide, lauroyl peroxide, t-butyl peroxypivalate, di-isopropylperoxydicarbonate and azobisisobutyronitrile.

7. The process of claim 1, wherein the amount of said polymer of methyl methacrylate ranges from 3 to 10 percent by weight based on the total amount of all components of said graft polymer.

8. The process of claim 7, wherein the amount of said polymer of methyl methacrylate ranges from 5 to 8 percent by weight based on the total amount of all components of said graft polymer.

9. The process of claim 1, wherein the amount of said polymer substrate ranges from 3 to 20 percent by weight based on the total amount of all components of said graft polymer.

10. The process of claim 9, wherein the amount of said polymer substrate ranges from 4 to 15 percent by weight based on the total amount of all components of said graft polymer.

11. A vinyl chloride graft polymer prepared by the process of claim 1, wherein the amount of methyl methacrylate polymer ranges from 3 to 10 percent by weight and the amount of polymer substrate ranges from 3 to 20 percent by weight, said percentage being based upon the total amount of said graft polymer.

12. The vinyl chloride graft polymer of claim 11, wherein the amount of methyl methacrylate polymer is from 5 to 8 percent by weight.

13. The vinyl chloride graft polymer of claim 11, wherein the amount of polymer substrate is from 4 to 15 percent by weight.

* * * * *